(12) United States Patent
Gosch et al.

(10) Patent No.: US 10,047,003 B2
(45) Date of Patent: Aug. 14, 2018

(54) ENAMEL POWDER, METAL COMPONENT HAVING A SURFACE SECTION PROVIDED WITH AN ENAMEL COATING AND METHOD FOR MANUFACTURING SUCH A METAL COMPONENT

(71) Applicant: Nemak, S.A.B. de C.V., Nuevo Leon (MX)

(72) Inventors: Rolf Gosch, Thalheim bei Wels (AT); Wolfgang Kuhn, Lauter-Bernsbach (DE); Annett Bretschneider, Zwonitz (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 14/902,952

(22) PCT Filed: Aug. 4, 2014

(86) PCT No.: PCT/EP2014/066735
§ 371 (c)(1),
(2) Date: Jan. 5, 2016

(87) PCT Pub. No.: WO2015/018795
PCT Pub. Date: Feb. 12, 2015

(65) Prior Publication Data
US 2016/0130174 A1    May 12, 2016

(30) Foreign Application Priority Data

Aug. 5, 2013 (DE) .......................... 10 2013 108 428

(51) Int. Cl.
*C03C 8/18* (2006.01)
*C03C 8/14* (2006.01)

(52) U.S. Cl.
CPC ................. *C03C 8/18* (2013.01); *C03C 8/14* (2013.01); *C03C 2207/08* (2013.01)

(58) Field of Classification Search
None
See application file for complete search history.

(56) References Cited

U.S. PATENT DOCUMENTS 3,922,138 A * 11/1975 Biddle .................... F24C 3/106
                                                    126/39 R
4,959,090 A    9/1990 Reinherz
(Continued)

FOREIGN PATENT DOCUMENTS

| CN | 1260328 A | 7/2000 |
| CN | 102976614 A | 3/2013 |

(Continued)

OTHER PUBLICATIONS

JP2010_195640_MT Sep. 9, 2010.*
JP 55-167152_MT Dec. 26, 1980.*
JP 57-088041_MT Jun. 1, 1982.*
Database WPI, Week 198110, Thomson Scientific, London, GB, AN 1981-16311D, XP002731279, 1 pg.
(Continued)

*Primary Examiner* — Vera Katz
(74) *Attorney, Agent, or Firm* — The Webb Law Firm

(57) ABSTRACT

An enamel powder for manufacturing a coating is present as a mixture which contains 100 parts of a glass powder, 0.1-7.5 parts of ceramic fibers, glass fibers or carbon fibers, and alternatively to one another or in combination with one another 10-21 parts of a powdery oxidic compound of a light metal or 1-5 parts of a powder of a heavy metal. A metal component provided with the enamel powder withstands a flow of hot gas against it. The invention specifies a method, by means of which such metal components can be provided with an enamel coating.

15 Claims, 1 Drawing Sheet

(56) References Cited

U.S. PATENT DOCUMENTS

| | | | | |
|---|---|---|---|---|
| 4,959,256 A | * | 9/1990 | Piera | A47J 36/02 |
| | | | | 220/62.11 |
| 5,676,043 A | * | 10/1997 | Best | A47J 37/0682 |
| | | | | 126/39 B |
| 6,126,737 A | | 10/2000 | Mason | |
| 2004/0202788 A1 | | 10/2004 | Willis et al. | |
| 2008/0317966 A1 | * | 12/2008 | Verlotski | C23C 4/10 |
| | | | | 427/452 |

FOREIGN PATENT DOCUMENTS

| | | |
|---|---|---|
| DE | 102006043535 A1 | 3/2008 |
| DE | 102010025286 A1 | 12/2011 |
| EP | 0362136 A2 | 4/1990 |
| JP | 55167152 A | 12/1980 |
| JP | 563673 A | 1/1981 |
| JP | 5788041 A | 6/1982 |
| JP | 5123773 A | 2/1986 |
| JP | 11189431 A | 7/1999 |
| JP | 200515759 A | 1/2005 |
| JP | 200589749 A | 4/2005 |

OTHER PUBLICATIONS

Database WPI, Week 199938, Thomson Scientific, London, GB, AN 1999-452833, XP002731280, 1 pg.

Kühn, Möglichkeiten and Grenzen der Emaillierung von Leichtmetallen, Oberflächen Polysurfaces, No. 2/09, pp. 6-9.

\* cited by examiner

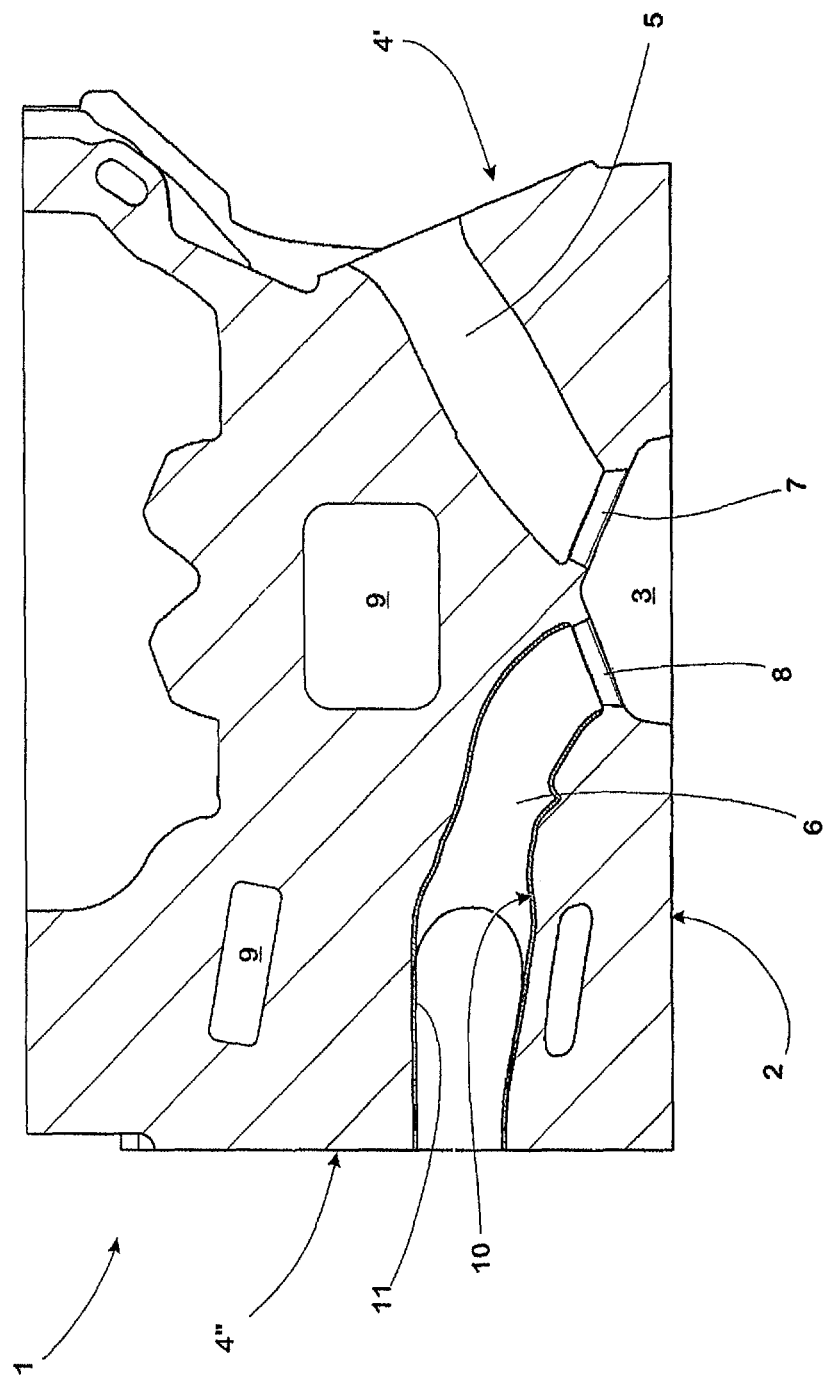

ENAMEL POWDER, METAL COMPONENT HAVING A SURFACE SECTION PROVIDED WITH AN ENAMEL COATING AND METHOD FOR MANUFACTURING SUCH A METAL COMPONENT

CROSS-REFERENCE TO RELATED APPLICATIONS

This application is the United States national phase of International Application No. PCT/EP2014/066735 filed Aug. 4, 2014, and claims priority to German Patent Application No. 10 2013 108 428.1 filed Aug. 5, 2013, the disclosures of which are hereby incorporated in their entirety by reference.

BACKGROUND OF THE INVENTION

Field of the Invention

The invention relates to an enamel powder, to a metal component having a surface section which is provided with an enamel coating and to a method for manufacturing such metal components.

Description of Related Art

As explained in detail in the article "Möglichkeiten and Grenzen der Emaillierung von Leichtmetallen" [*Means and limitations of enamelling light metals*] by Dr.-Ing. Wolfgang Kühn, published in Oberflächen [*Surfaces*] Polysurfaces No. 2/09, pages 6-9, alongside the means of enamelling components made of steel and copper, which has been known for centuries, the enamelling of components made of light metals, such as aluminium, magnesium and titanium, has increasingly gained in importance since the middle of the last century. Here, from the technical point of view, the protection of the component surfaces from corrosive attacks has priority.

As is explained further in the mentioned article, the enamel coatings are glass layers which have been adapted to the substrates provided for them in particular with respect to the melting temperature and the coefficient of thermal expansion. They combine the properties of a glass surface with the material properties and processing properties of metals. In contrast to other coatings, a glass-metal composite combines when the respective enamel coating is fired, in which intermediate layers, so-called intermetallic phases, form between the glass material and the metal substrate. These intermediate layers ensure that the coating is particularly intensively bonded to the metal. For this purpose, nowadays modern enamels are multicomponent mixtures which with the aid of their eutectic system at low firing temperatures acquire a very good mechanical hardness and chemical resistance. Enamelled workpieces are machinable by bending, sawing or drilling, for example, and can additionally be provided with functional, nanoscale sol-gel layers, in order, for example, to supplement the hard scratch-resistant enamel coating with a temperature-resistant non-stick effect.

In addition, it is known from DE 10 2010 025 286 A1 that the inner surfaces of exhaust gas ducts of light metal cast parts, such as cylinder heads for internal combustion engines, can be effectively protected against excessive thermal stress by coating them, at least in sections, with a coating which consists of a glass material. When applying this proposal in practice, a particular challenge is set by the fact that the coating, on the one hand, has to reliably withstand the mechanical and thermal loads which occur during operation and, on the other hand, has to allow sections of the respective component abutting on the coated surface section to be machined without the risk of the coating chipping.

SUMMARY OF THE INVENTION

Against the background of the prior art mentioned above, the object of the invention consisted in providing a coating material which allows a coating to be produced on a metal component, in particular a light metal component, this coating also being able to reliably bear high mechanical and thermal loads and in the process also being suitable for machining. In addition, a metal component, which is provided with a correspondingly constituted coating on at least one surface section, and a method for manufacturing such a metal component should be specified.

An enamel powder according to the invention is present as a mixture which contains 100 parts of a glass powder, optionally 10-22 parts of coarse glass granulates which are larger than the glass powder particles, 0.1-7.5 parts of ceramic fibres, glass fibres or carbon fibres, and alternatively to one another or in combination with one another 10-21 parts of a powdery oxidic compound of a light metal or 1-5 parts of a powder of a heavy metal. When "parts" are mentioned as the dosing measure here, as is usual in enamel technology, then this is understood as the quantity of the respective constituent added to the enamel powder being measured by means of a unit measure which is the same for all constituents and the "parts" respectively provided according to the invention for the individual constituents denoting the respective multiples of this unit measure. Therefore, the data in "parts" used here are quantity data (i.e. not volume data) which are based on a certain arbitrary unit of weight, such as g or kg. The respective unit of weight can be selected as a function of the respectively required total quantity. If only small quantities in the region of less than one kilogramme of the enamel powder according to the invention are required "gramme" is selected as the reference unit. Then, 100 g of a glass powder, optionally 10-22 g of coarse glass granulates which are larger than the glass powder particles, 0.1-7.5 g of ceramic fibres, glass fibres or carbon fibres and alternatively to one another or in combination with one another 10-21 g of a powdery oxidic compound of a light metal or 1-5 g of a powder of a heavy metal are mixed to form an enamel according to the invention. If, on the other hand, a quantity of the size of 500 kg is required, then, for example, the "5 kg" quantity unit can be assigned to each "part" of the enamel powder formulation according to the invention. According to the invention, then, 500 kg of a glass powder, optionally 50-110 kg of coarse glass granulates which are larger than the glass powder particles, 0.5-37.5 kg of ceramic fibres, glass fibres or carbon fibres and alternatively to one another or in combination with one another 50-105 kg of a powdery oxidic compound of a light metal or 5-25 kg of a powder of a heavy metal are mixed to form an enamel according to the invention.

The individual constituents of the enamel powder according to the invention have the following definitions:

a) Glass Powder

The glass powder is the basis of the enamel powder according to the invention and forms the matrix for the enamel coating constituted according to the invention and produced on the respective surface section of the metal component, in which matrix the other constituents of the enamel powder are embedded.

The types of glass commonly used for this purpose in the prior art can be used as the glass powder. At the same time, glass powders consisting of types of glass which have a lower coefficient of expansion than the substrate material, on which the surface section is present which in each case is to be coated with the enamel coating formed by the enamel powder according to the invention, are suitable for the invention. In order to prevent the respective metal substrate from being damaged or deformed in the course of firing the enamel coating, the glass powder produced from such types of glass should melt at a temperature which is lower than the temperature range in which the melting temperature of the respective substrate material lies.

Typical acceptable melting temperatures of the glass powder when applied on surface sections of light metal components lie in the range from 480-650° C., in particular 540-580° C. or 510-540° C.

When applied on surfaces of components which are manufactured from light metal, it has become apparent that an enamel coating produced with such a glass powder as the basis and in other respects composed according to the invention then also reliably withstands the thermal and mechanical loads and reliably protects the light metal substrate, if the temperature to which the respective component on the surface provided with the enamel coating is exposed to in operation is much higher than the melting temperature of the light metal material and of the actual coating produced from enamel powder according to the invention. Thus, enamel powder according to the invention is in particular suitable for coating surfaces of components for internal combustion engines manufactured from light metal material, in particular from an aluminium material, which in use are exposed to a hot exhaust gas flow. Components of this kind are in practice regularly manufactured by casting.

However, enamel powder according to the invention is not only suitable for coating surface sections exposed to hot gas flows, but can also be used for coating surfaces which are on the outside of metal components. In the case of components heated to high temperatures in operation, the coat formed from enamel powder according to the invention can serve to reduce heat radiation.

Surfaces on metal components can equally be coated with enamel powder according to the invention which after coating are to have a very smooth surface. Such surfaces can, for example, be provided where fluid flows through ducts of metal components or on other component sections which in operation are exposed to a fluid flowing along them.

A coating produced from an enamel powder according to the invention can also in an aggressive environment in a targeted way protect the surface respectively provided with an enamel coating produced according to the invention against corrosion.

The grain size (average diameter) of the particles of the glass powder forming the basis of an enamel powder according to the invention typically lies in the range from 5-40 µm, wherein glass powders with a grain size which on average is 25 µm have proved to be particularly suitable in practice.

b) Coarse Glass Granulates 10-22 parts of coarse glass granulates can optionally be added to an enamel powder according to the invention, in order to provide the enamel coating produced from an enamel powder according to the invention with a further improved resistance to crack formation. Those glass particles which are larger than the largest particles of the glass powder which forms the basis of an enamel powder according to the invention are referred to as "coarse glass granulates". Hence, typically, glass granulates with an average diameter of more than 40 µm are included among these. At the same time, the average diameter of the coarse glass granulates should not exceed 500 µm, in order to prevent the coating produced according to the invention with an enamel powder according to the invention from excessively coarsening.

Due to their comparably large volume, the coarse granulates do not fully melt when the enamel coating is fired, but rather retain their basic structure. If, in practical use, cracks form in the enamel coating, then the glass granulates present in the enamel coating according to the invention block the further expansion of the cracks acting as a kind of barrier which cannot be overcome by the respective crack. In this way, the advance of the crack is counteracted and further damage to the coating is prevented.

Glass particles which are composed like an enamel powder according to the invention can be used as coarse glass granulates. The coarse glass granulates produced from such an enamel powder then have a composition and properties which correspond to the composition and properties of a coating produced from the enamel powder according to the invention. In this way, it is ensured that the coating produced according to the invention, despite the presence of the coarse glass granulates, has homogenous properties to the greatest possible extent and equally consistent behaviour. Those coarse glass granulates which have already been added as frit in the course of manufacturing enamel powder according to the invention have proved to be particularly suitable for an enamel powder according to the invention. Such fritted glass granulates, i.e. glass granulates which are not quite melted through, have proved to be particularly effective with regard to preventing the formation of larger cracks in enamel coatings produced by the enamel powder according to the invention.

In order that the effect of the coarse glass granulates occurs with the desired reliability, the enamel powder according to the invention contains 10-22 parts of these glass granulates, wherein an optimum effect ensues if at least 15 parts of coarse glass granulates are added to the enamel powder according to the invention.

c) Ceramic Fibres, Glass Fibres or Carbon Fibres

The fibres present in an enamel powder according to the invention have a special importance. They ensure that an enamel coating formed from the powder according to the invention reliably holds together even under high stress which can occur due to temperature fluctuations and mechanical pressure loads occurring in practical use.

In order to fulfil this function, 0.1-7.5 parts, in particular at least 2 parts or at least 3.5-7.5 parts, of ceramic fibres, glass fibres or carbon fibres are present in an enamel powder according to the invention, wherein the ceramic fibres, glass fibres and the carbon fibres can be respectively added separately or as a mixture. Optimal effects are produced if 4-6 parts of fibre material are present in the powder according to the invention.

In principle, ceramic fibres, glass fibres or carbon fibres having a fibre length of 10-9000 µm are eligible for the enamel powder according to the invention. A long fibre length proves to be advantageous with regard to the cohesion of the enamel coating formed from an enamel powder according to the invention, but can impair the workability. With a fibre length of less than 10 µm the reinforcing effect is too weak. Fibres having a length of 10-1000 µm have proved to be sufficiently effective and, at the same time, have proved to guarantee good workability.

Commercially available fibres can be used for carbon fibres. The same applies for the ceramic fibres and glass fibres, wherein here silicon carbide fibres or glass fibres of different compositions can be cited by way of example.

d) Oxidic Compounds of a Light Metal or Powder or a Heavy Metal

Powdery oxidic compounds of a light metal or powder of a heavy metal can, at the same time or alternatively, be present in the enamel powder according to the invention, in order to shift the melting point of the coating formed from the enamel powder in areas which are not critical with regard to the respective intended use.

In this way, enamel coatings can also be produced on light metal components, which form in uncritical firing conditions with regard to the melting temperature of the respective light metal material, but in practical use are temperature-resistant such that they can safely withstand the maximum temperatures which occur.

In order to achieve this effect, an enamel powder according to the invention contains 10-21 parts, in particular 12-17 parts, of a powdery oxidic compound of a light metal and/or 1-5 parts, in particular 2-4 parts, of a powder of a heavy metal.

Metals having a density of less than 5 $g/cm^3$ are understood as "light metals" in this text. Al, Ti and Mg in particular are included among these.

From the oxides of these light metals, Al oxides are particularly suitable for use in an enamel powder according to the invention due to their high melting point of more than 2000° C. However, particularly when coating light metal components, other light metal oxide powders, such as powder consisting of Ti oxide and suchlike, can be used, the melting point of which in each case is still more than 1000° C. and hence clearly lies above the melting temperature range of the light metal substrate.

The respectively provided light metal oxides can influence the properties of an enamel coating produced from the enamel powder according to the invention in an optimum way if the light metal oxides are present in quantities of up to 30% in relation to the quantity of the amorphous coating material formed from the enamel powder.

All metals and their alloys which have a density of at least 5 $g/cm^3$ are regarded as "heavy metals". All iron-based materials are included among these, in particular metal powders consisting of alloyed steels. Metal powders which consist of high-grade steel, such as the steels X5CrNi18-10 and X5CrNiMo17-12-2 known under the designations "V2A" and "V4A" and standardised under the material numbers 1.4301 and 1.4401, have proved to be particularly suitable. It has also proved to be advantageous here if the melting point of the respective metal powder is more than 1000° C., so that no change in the properties of the metal powder occurs during the firing process.

The metal powder can influence the properties of an enamel coating produced from the enamel powder according to the invention in an optimum way if the metal powders of the heavy metals or of their alloys are present in quantities of up to 10% in relation to the quantity of the amorphous coating material.

The average diameter of the grains of the respective metal powder or of the respectively powdery oxides of a light metal added to the enamel powder according to the invention should typically lie in the range from 10-500 μm.

e) Other Constituents

In addition to the previously defined constituents, optionally, of course, other additives can be present in the enamel powder according to the invention, as are typically required for producing an enamel coat. Boric acid, caustic potash solution, water glass or demineralised water are included among these, for example.

The enamel powder according to the invention can be produced by mixing together the individual constituents in the specified quantities and grinding them up together until a uniform powder is obtained. The coarse glass granulates can be added sufficiently late to the material to be ground such that they are not fully pulverised by the end of the grinding process but are still present in the completely ground powder in the size required according to the invention. In the same way, the fibres can also only be added to the material to be ground at a later point in time during the grinding process, so that they are also not fully pulverised but are present in the required length at the end of the grinding process.

Alternatively, the enamel powder according to the invention can also be mixed from constituents prefabricated separately with the respectively required grain size.

Utilising the previously defined properties of an enamel coating produced from an enamel powder according to the invention, a metal component according to the invention has a surface section which is coated with an enamel coating, which is formed from an enamel powder according to the invention, in order to protect against the thermal and mechanical loads to which it is exposed in practical use. The invention proves to be particularly advantageous for those metal components, in which the respective surface coated according to the invention has to endure high thermal and mechanical loads as a result of a hot gas flowing against it, in particular an exhaust gas of an internal combustion engine.

The coating composed and produced according to the invention is an inorganic, non-metallic amorphous material which owing to its constituents has a high durability with varying thermal and mechanical loads. In the process, due to the presence of coarser glass particles it is ensured that even if smaller cracks form in the coating no larger crack formation occurs and the coating continues to stick to the respective surface section. At the same time, the fibres present in the enamel coating provided according to the invention ensure that the enamel coating also holds together under high stresses.

An enamel coating constituted according to the invention due to its constituents fundamentally has a higher resistance to pressure than tensile strength. Therefore, the tendency of the enamel coating to form cracks and chip can be further minimised by the surface section respectively coated with it by the composition of the enamel powder being set within the limits specified according to the invention such that the coefficient of expansion of the enamel coating is lower than the coefficient of expansion of the metal component in the surface section which is coated with the enamel coating.

The enamel powder according to the invention is particularly suitable for producing an enamel coating on a metal component which consists of light metal or of a light metal alloy. This in particular applies for those metal components which are manufactured by casting. Thus, in particular surface sections of light metal cast parts, especially aluminium cast parts, can be coated in the way according to the invention. A use of enamel coatings of the type according to the invention, which is particularly important from an economic and technical point of view, is the coating of surface sections on light metal cast parts which are destined for the construction of internal combustion engines. The inner surfaces of ducts of cylinder heads, turbocharger housings and suchlike which discharge exhaust gas are included among these, for example.

The method according to the invention for manufacturing a metal component according to the invention generally comprises the following production steps:

providing the metal component, applying an enamel slip, which is formed using an enamel powder according to the invention and a slip means, to the surface section of the metal component to be respectively coated and producing the enamel coating by firing the enamel slip at a temperature which is lower than the melting temperature of the material of which the metal component consists.

Demineralised water is, for example, suitable for the slip means. In addition, further additives, such as magnesium chloride, sodium nitrite, boric acid, caustic potash solution or water glass can be present in the enamel slip as set-up agents.

The slip is applied to the surface to be respectively coated, for example by spraying, flooding or spreading it on. Flooding is particularly suitable for applying the enamel coat on inner surfaces of narrow ducts, recesses and cavities. This applies, for example, for narrow exhaust gas ducts, such as those which are to be found in components for internal combustion engines. The coat thickness can be adapted to the respective application. Thus, it can, if necessary, be more than 0.5 mm, in particular in the range of up to 1 mm. Coat thicknesses of 300-600 µm, for example, have proved to be sufficient for the requirements presented in practice. However, in the case of high thermal and mechanical loads, it can be advantageous if greater coat thicknesses are provided, in order to protect the respective metal substrate sufficiently against the effect of the hot gas flowing against it. In such cases, enamel coatings which are more than 0.6 mm thick, in particular those which are up to 0.75 mm thick, up to 1 mm thick, up to 1.5 mm thick or up to 2 mm thick, can be advantageous.

Coatings with greater coat thicknesses of 150 µm and more can be formed by applying two or more coats, wherein the individual coats can be respectively applied in one pass. In doing so, a coat structure can be formed, the uppermost cover coat of which is formed from enamel powder according to the invention, while between the cover coat one or more coats are present which consist of a ground enamel which is already used for these purposes in the prior art. The cover coat consisting of enamel powder according to the invention as the functional coat then forms the outer finish of the overall coating.

In order to ensure that the enamel coating bonds to the respective surface section of the metal component in an optimum way, the surface section of the metal component to be coated with the enamel coating can be subjected to a surface treatment before applying the enamel slip, in which the surface section is degreased and passivated and a near-surface oxide layer present on the surface section is broken up. The oxide layer can be broken up, for example, by blasting, mechanical roughening up or suchlike.

If the enamel coating according to the invention is produced on a light metal component, then the firing is optimally carried out with enamel slip which is still damp and not fully dried.

The firing of the enamel coating is carried out at temperatures which in each case are lower than the melting temperature of the metal material of which the surface section to be respectively coated consists. In the case of components manufactured from aluminium, firing temperatures typically lie in the range from 480-650° C., in particular 510-540° C.

The firing can be carried out as a separate production step and in the process in each case only takes up a short period of time, since the applied enamel slip coat only has to be briefly heated to the firing temperature to enable the glass matrix to fuse and bind to the metal substrate.

Alternatively, the firing can also be carried out in combination with a heat treatment step, to which the respective metal component is subjected, in order to set its mechanical or other properties. In the case of aluminium cast parts or other light metal cast parts, solution annealing, which is required in many applications, is, for example, appropriate for this, in which the respective cast part is kept in the temperature range suitable for the firing process.

The particular advantage of the enamel coating produced according to the invention is that a metal component coated in such a way can, after firing the enamel slip, be subjected to machining in the area of the surface section provided with the obtained enamel coating without destroying the enamel coating.

BRIEF DESCRIPTION OF THE DRAWING

The invention is explained in more detail below with the aid of a drawing representing an exemplary embodiment.

The single FIGURE shows a cutaway drawing of a cylinder head in a section aligned transverse to the longitudinal extension of the cylinder head.

DETAILED DESCRIPTION OF THE INVENTION

The cylinder head 1 cast from an aluminium cast material usually used for these purposes, for example an AlSi 11 alloy, for a spark ignition engine or diesel engine has a flat contact surface 2, by means of which in use, via a cylinder head gasket which is inserted as appropriate and is not shown here, it rests on an engine block of the respective internal combustion engine which is likewise not illustrated here. The internal combustion engine has combustion chambers arranged in series with pistons inside them which are moved up and down and are also not visible here.

Many dome-shaped recesses 3, corresponding to the number of cylinders of the internal combustion engine, are moulded into the contact surface 2 and form the upper closure of the combustion chambers of the internal combustion engine in the stroke direction of the pistons of the internal combustion engine.

An intake port 5 fed from the one longitudinal side 4' of the cylinder head 1 in each case opens out into the recesses 3, via which intake port 5 in operation the respective fuel-air mixture is admitted into the combustion chamber. At the same time, an exhaust gas duct 6 leaves the respective recess 3 and is led to the opposite longitudinal side 4" of the cylinder head 1, via which exhaust gas duct 6 the exhaust gas accumulating during the combustion process is discharged from the combustion chamber of the internal combustion chamber. The opening 7 of the intake port 5 and the inlet opening 8 of the exhaust gas duct 6 as a function of the progress of the combustion process are opened or closed in a manner which is known per se by respective valves which are not illustrated here for the sake of clarity.

In order to dissipate the heat arising in operation as a result of the combustion process, the cylinder head 1 is crossed through by cooling ducts 9 in a manner which is also known per se, through which in operation coolant flows.

The inner surfaces 10 of the exhaust gas duct 6 enclosing the exhaust gas duct 6 are exposed to high thermal and mechanical loads in operation, particularly in the area connected to its inlet opening 8, by the hot exhaust gas flowing into the exhaust gas duct 6 at a high flow speed when the inlet opening is open.

In order to provide protection against these loads, the inner surfaces 10 are coated with a thin enamel coating 11, the thickness of which is on average 400 μm and which covers the inner surfaces 10 over the entire length of the exhaust gas duct 6.

The enamel coating 11 was formed corresponding to the required coat thickness in one or more passes by firing one or more coat(s) consisting of enamel slip which was applied to the inner surface 10 with a thickness of 180 μm by flooding the exhaust duct 6 with enamel slip and subsequently was fired still in the damp state at a firing temperature of 520° C. to form the enamel coating. The enamel coat obtained in this way then has a thickness of about 120 μm, for example.

In order to produce the enamel slip

| | |
|---|---|
| 100.0 | parts of glass powder, the glass particles of which had an average diameter of 25 μm, |
| 20.0 | parts of coarse glass granulates having an average diameter of 100 μm, |
| 0.5 | parts of carbon fibres having an average length of 300 μm, |
| 15.0 | parts of aluminium oxide particles having an average diameter of 100 μm and |
| 3.0 | parts of a powder consisting of V2A high-grade steel, wherein the average diameter of the particles of the high-grade steel powder was on average 50 μm, | were mixed together to form an enamel powder and subsequently processed with 38.0 parts of demineralised water into the enamel slip. The individual components were ground up together for this purpose, for example, wherein by choosing the point in time for adding the respective component taking account of the material properties the grain size which the respective component had at the end of the grinding process was determined.

The application of the enamel slip combined in this way which took place by flooding was preceded by a surface treatment, in which the inner surfaces 11 were thermally or chemically degreased and subsequently chemically passivated, and in which additionally the oxide layer, which had formed there as a result of the contact between the Al cast material of the cylinder head 1 and the ambient oxygen, was broken up by targeted roughening of the inner surfaces 11.

REFERENCE NUMBERS

1 Cylinder head
2 Contact surface
3 Combustion chamber recess
4', 4" Longitudinal sides
5 Intake port
6 Exhaust gas duct
7 Opening of the intake port 5
8 Inlet opening of the exhaust gas duct 6
9 Cooling ducts
10 Inner surfaces of the exhaust gas duct 6
11 Enamel coating

The invention claimed is:

1. A metal component consisting of a light metal and having a surface section provided with an enamel coating, wherein the metal component is coated with an enamel coating on the surface section, this enamel coating being formed from an enamel powder which is present as a mixture which contains:
   100 parts of a glass powder, wherein an average diameter of particles of the glass powder ranges from 5-40 μm,
   0.1-7.5 parts of ceramic fibres, glass fibres or carbon fibres,
   10-22 parts of coarse glass granulates which are larger than the glass powder particles, wherein an average diameter of the coarse glass granulates is more than 40 μm and does not exceed 500 μm, wherein the average diameter of the coarse glass granulates is sufficiently large such that the coarse glass granulates do not fully melt upon firing of the enamel coating,
   and alternatively to one another or in combination with one another
      10-21 parts of a powdery oxidic compound of a light metal or
      1-5 parts of a powder of a heavy metal.

2. The metal component according to claim 1, wherein the coefficient of expansion of the enamel coating is lower than the coefficient of expansion of the metal component in the surface section which is coated with the enamel coating.

3. The metal component according to claim 2, wherein the surface section provided with the enamel coating is an inner surface of a gas duct.

4. The metal component according to claim 1, wherein the surface section provided with the enamel coating is an inner surface of a gas duct.

5. The metal component according to claim 1, wherein the metal component is a cylinder head for an internal combustion engine.

6. The metal component according to claim 1, wherein the surface section provided with the enamel coating is on an outside of the metal component.

7. The metal component according to claim 1, wherein the oxidic compound of a light metal of the enamel powder is aluminum oxide.

8. The metal component according to claim 1, wherein the coarse glass granulates of the enamel powder consist of a glass material, whose composition and properties corresponds to the composition and properties of an enamel coating produced from the enamel powder.

9. The metal component according to claim 1, wherein the melting point of the oxidic compound of the enamel powder is greater than 1000° C.

10. The metal component according to claim 1, wherein the mixture includes 1-5 parts of the powder of a heavy metal.

11. A method for producing a metal component formed according to claim 1, comprising the following production steps:
   providing the metal component,
   applying an enamel slip, which is formed using an enamel powder and a slip means, to the surface section of the metal component to be coated, and
   producing the enamel coating by firing the enamel slip at a temperature which is lower than the melting temperature of the material of which the metal component consists.

12. The method according to claim 11, wherein the enamel slip is fired in the course of a heat treatment process, to which the metal component is subjected in order to set its mechanical properties.

13. The method according to claim 11, wherein the metal component after firing the enamel slip undergoes machining in an area of the surface section provided with the obtained enamel coating.

14. The method according to claim 11, wherein the surface section of the metal component to be coated with the enamel coating before applying the enamel slip is subjected to a surface treatment, in which the surface section is degreased and passivated and a near-surface oxide layer present on the surface section is broken up.

15. The method according to claim 12, wherein the metal component after firing the enamel slip undergoes machining in an area of the surface section provided with the obtained enamel coating.

\* \* \* \* \*